United States Patent
Dhodapkar et al.

(10) Patent No.: US 10,683,398 B2
(45) Date of Patent: Jun. 16, 2020

(54) POLYMER COATINGS COMPOSITIONS WITH REDUCED IGNITION SENSITIVITY

(71) Applicant: Dow Global Technologies LLC, Midland, MI (US)

(72) Inventors: Shrikant Dhodapkar, Lake Jackson, TX (US); Remi A. Trottier, Angleton, TX (US); Robert Bellair, Pearland, TX (US); Konanur Manjunath, Fulshear, TX (US); Pradeep Jain, Lake Jackson, TX (US); Michael D. Turner, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/752,315

(22) PCT Filed: Sep. 16, 2016

(86) PCT No.: PCT/US2016/052099
§ 371 (c)(1),
(2) Date: Feb. 13, 2018

(87) PCT Pub. No.: WO2017/049064
PCT Pub. Date: Mar. 23, 2017

(65) Prior Publication Data
US 2018/0265650 A1    Sep. 20, 2018

Related U.S. Application Data

(60) Provisional application No. 62/219,929, filed on Sep. 17, 2015.

(51) Int. Cl.
| | |
|---|---|
| *C08J 3/12* | (2006.01) |
| *C08K 9/08* | (2006.01) |
| *C08K 3/34* | (2006.01) |
| *C08K 3/26* | (2006.01) |
| *C08K 5/5415* | (2006.01) |
| *B29B 9/16* | (2006.01) |
| *B29B 9/12* | (2006.01) |

(52) U.S. Cl.
CPC ............. *C08J 3/128* (2013.01); *B29B 9/16* (2013.01); *C08J 3/124* (2013.01); *C08J 3/126* (2013.01); *C08K 3/26* (2013.01); *C08K 3/34* (2013.01); *C08K 5/5415* (2013.01); *C08K 9/08* (2013.01); *B29B 2009/125* (2013.01); *B29B 2009/163* (2013.01); *C08J 2323/08* (2013.01); *C08K 2003/265* (2013.01); *C08K 2201/013* (2013.01)

(58) Field of Classification Search
CPC ........ B32B 2009/125; B32B 2009/163; B32B 9/16
See application file for complete search history.

(56) References Cited

U.S. PATENT DOCUMENTS

| | | | |
|---|---|---|---|
| 3,645,992 A | 2/1972 | Trevor | |
| 4,076,698 A | 2/1978 | Anderson et al. | |
| 5,272,236 A | 12/1993 | Lai et al. | |
| 5,278,272 A | 1/1994 | Lai et al. | |
| 5,366,645 A | 11/1994 | Sobottka | |
| 5,834,571 A * | 11/1998 | Bernier | B01J 8/1827 526/68 |
| 6,228,902 B1 * | 5/2001 | Brueggeman | C08J 3/124 523/200 |
| 6,852,787 B1 | 2/2005 | McMichael et al. | |
| 7,101,926 B2 | 9/2006 | McMichael et al. | |
| 7,122,584 B2 | 10/2006 | Moriya et al. | |
| 9,290,668 B2 | 3/2016 | Dhodapkar et al. | |
| 2004/0198896 A1 | 10/2004 | Pakusch et al. | |
| 2006/0199930 A1 | 9/2006 | Li Pi Shan et al. | |
| 2012/0142840 A1 * | 6/2012 | Abad | B29B 9/12 524/399 |
| 2014/0155523 A1 * | 6/2014 | Hernandez-Zamora | C09J 195/00 524/71 |
| 2015/0037496 A1 | 2/2015 | Wicks et al. | |

FOREIGN PATENT DOCUMENTS

| | | |
|---|---|---|
| EP | 1403313 A1 | 3/2004 |
| WO | 9918148 A1 | 4/1999 |
| WO | 2005090428 A1 | 9/2005 |
| WO | 2012003542 A1 | 1/2012 |
| WO | 2012131458 A1 | 10/2012 |

OTHER PUBLICATIONS

Amyotte, Paul R., "Solid inertants and their use in dust explosion prevention and mitigation", Journal of Loss Prevention in the Process Industries 19 (2006) 161-173.
Janesa et al., "Experimental investigation of the influence of inertsolids on ignition sensitivity of organic powders powders", Process Safety and Environmental Protection (2014) 311-323.
Dufaud et al., "When solids meet solids: A glimpse into dust mixture explosions", Journal of Loss Prevention in the Process Industries 25 (2012).
International Search Report and Written Opinion pertaining to PCT/US2016/052099 dated Dec. 9, 2016.
(Continued)

Primary Examiner — Alexandre F Ferre
(74) Attorney, Agent, or Firm — Dinsmore & Shohl LLP

(57) ABSTRACT

A composition is provided that comprises at least the following: polymer particles comprising a coating on at least a portion of the total surface of the polymer particles, and wherein the coating is formed from a powder composition comprising at least one inorganic powder, and at least one organic powder selected from a metal stearate and/or a polymer powder, and wherein the weight ratio of the total amount of the inorganic powder to the total amount of the organic powder is from 3.0 to 50.0.

10 Claims, No Drawings

(56) References Cited

OTHER PUBLICATIONS

Koyama, XP002611161, "Filled Polyolefin Material Production by forming on Polyolefin Granules Layer of INorganic Fillets and Binders and Kneading", 1985.

Chinese Office Action pertaining to corresponding Chinese Patent Application No. 201680051525.5, dated Sep. 25, 2019 (received Nov. 12, 2019).

\* cited by examiner

US 10,683,398 B2

POLYMER COATINGS COMPOSITIONS WITH REDUCED IGNITION SENSITIVITY

REFERENCE TO RELATED APPLICATIONS

The present application claims the benefit of U.S. Provisional Application No. 62/219,929, filed Sep. 17, 2015, incorporated herein by reference.

BACKGROUND

Elastomeric pellets are prone to blocking, unless specific anti-blocking measures are taken to mitigate the massing issue. Blockiness refers to the lumpy appearance of polymeric particles, often observed in the shipment of polymer pellets in bags, boxes or railcars. In some situations, the entire mass of the polymer particles may form a single lump or a block of consolidated pellets. This can be contrasted with polymer particles that remain free-flowing, regardless of stress, temperature and time spent in shipment.

Calcium stearate (CaSt) and other metal stearates have been used as an anti-blocking agents. However, CaSt is combustible when handled in air. This poses significant risks associated with the handling of the CaSt coated particles, and requires expensive engineering controls (e.g. inert blanketing) to mitigate such risks. Additionally, the end user must also use engineering controls to mitigate handling risks. There is a need for coating compositions with reduced ignition threshold sensitivity and with good anti-blocking properties. Coated polymer compositions are described in the following references: U.S. Pat. Nos. 6,852,787; 7,101,926 and 5,366,645. However, there is still a need for new compositions with reduced ignition sensitivity, and which have improved anti-blocking properties. These needs have been met by the following invention.

SUMMARY OF THE INVENTION

A composition is provided, that comprises at least the following: polymer particles comprising a coating on at least a portion of the total surface of the polymer particles, and wherein the coating is formed from a powder composition comprising at least one inorganic powder, and at least one organic powder selected from a metal stearate and/or a polymer powder, and wherein the weight ratio of the total amount of the inorganic powder to the total amount of the organic powder is from 3.0 to 50.0.

Also provided, is a powder composition comprising at least the following: at least one inorganic powder, and at least one organic powder selected from a metal stearate and/or a polymer powder, and wherein the weight ratio of the total amount of inorganic powder to the total amount of organic powder is from 3.0 to 50.0; and wherein the total amount of inorganic powder and the total amount of organic powder comprise greater than, or equal to 95 wt %, based on the weight of the powder composition.

DETAILED DESCRIPTION

Compositions with reduced ignition sensitivity have been discovered which have excellent blocking characteristics for the same dust loading on pellets. The mixture can then be applied to the pellets in an existing process without needing additional engineering controls.

As discussed above, a composition is provided, comprising at least the following: polymer particles comprising a coating on at least a portion of the total surface of the polymer particles, and wherein the coating is formed from a powder composition comprising at least one inorganic powder, and at least one organic powder selected from a metal stearate and/or a polymer powder, and wherein the weight ratio of the total amount of the inorganic powder to the total amount of the organic powder is from 3.0 to 50.0.

Also provided, is a powder composition, comprising at least the following: at least one inorganic powder, and at least one organic powder selected from a metal stearate and/or a polymer powder, and wherein the weight ratio of the total amount of inorganic powder to the total amount of organic powder is from 3.0 to 50.0; and wherein the total amount of inorganic powder and the total amount of organic powder comprise greater than, or equal to 95 wt %, based on the (or "of the") weight of the powder composition.

An inventive composition may comprise a combination of two or more embodiments described herein.

An inventive powder composition may comprise a combination of two or more embodiments described herein.

The following embodiments apply to both an inventive composition and an inventive powder composition.

In one embodiment, the weight ratio of the total amount of inorganic powder to the total amount organic powder is from 3.0 to 45.0, or from 3.0 to 40.0, or from 3.0 to 35.0, or from 3.0 to 25.0, or from 3.0 to 20.0.

In one embodiment, the weight ratio of the total amount of inorganic powder to the total amount organic powder is from 3.0 to 15.0, or from 3.0 to 12.0, or from 3.0 to 9.0.

In one embodiment, the organic powder is a metal stearate, and further calcium stearate or zinc stearate, and further calcium stearate.

In one embodiment, at least one inorganic powder is selected from the group consisting of the following: talc, mica, calcium carbonate, finely divided silica, fumed silica, quartz, and combinations thereof. In one embodiment, at least one inorganic powder is selected from the group consisting of the following: talc, mica, calcium carbonate, and combinations thereof; or talc, mica, or combinations thereof. In one embodiment, the inorganic powder is talc.

The invention also provides an article comprising at least one component formed from an inventive powder composition.

The invention also provides an article comprising at least one component formed from an inventive composition.

The following embodiments apply to an inventive composition.

In one embodiment, the polymer particles comprise a coating on at least 50%, or at least 60%, or at least 70%, or at least 80% of the total surface of the polymer particle. In a further embodiment, the coating is the powder composition.

In one embodiment, the polymer particles comprise a coating on at least 85%, or at least 90%, or at least 95%, of the total surface of the polymer particle. In a further embodiment, the coating is the powder composition.

The total surface area of the polymer particles can be calculated from the average pellet dimensions of the particles (for example, pellets) and the weight of the particles per gram; or by a BET analysis (for example, using a BET instrument available from Micromeritics ASAP 2420). The amount of surface area of the polymer particles that has been coated with a powder composition can be determined by visual inspection, typically with the use of a magnifying glass.

In one embodiment, the polymer particles are formed from a polymer composition comprising an olefin-based polymer, or an olefin-based interpolymer, or an olefin-based copolymer. In a further embodiment, the olefin-based polymer, interpolymer, or copolymer, comprises >90 wt %, or >95 wt %, or >98 wt % of the polymer composition.

In one embodiment, the olefin-based polymer is an ethylene-based polymer, or an ethylene-based interpolymer, or an ethylene-based copolymer.

In one embodiment, the olefin-based polymer is an ethylene/α-olefin interpolymer, and further an ethylene/α-olefin copolymer. In a further embodiment, the α-olefin is selected from the group consisting of propylene, 1-butene, 1-pentene, 1-hexene, 1-heptene, and 1-octene.

In one embodiment, the olefin-based polymer is an ethylene-based polymer, and the polymer composition comprises >90 wt %, or >95 wt %, or >98 wt % of the ethylene-based polymer, based on the weight of the polymer composition. In a further embodiment, the ethylene-based polymer is an ethylene/α-olefin interpolymer, and further an ethylene/α-olefin copolymer. In a further embodiment, the α-olefin is selected from the group consisting of propylene, 1-butene, 1-pentene, 1-hexene, 1-heptene, and 1-octene.

In one embodiment, the polymer composition comprises an olefin-based polymer and at least one other thermoplastic polymer. In a further embodiment, the at least one other thermoplastic polymer is selected from the group consisting of polystyrene homopolymer, polyethylene homopolymer and polypropylene homopolymer.

In one embodiment, the composition further comprises a binder. See discussion of binder below. In one embodiment, at least a portion of the binder coats at least a portion of the total surface of the polymer particles, to form a binder coating, and such that the binder coating is located between the polymer particles and the coating formed from the powder composition.

In one embodiment, the binder is selected from the group consisting of the following: polyether polyols; aliphatic hydrocarbon oils; alkanes having from 7 to 18 carbon atoms, and optionally substituted with OH, $CO_2H$, or esters; alkenes having from 7 to 18 carbon atoms, and optionally substituted with OH, $CO_2H$, or esters; natural oils; naphthenic oils; paraffinic oils; aromatic oils; silicone oils (or silicone fluids); plasticizers; tackifiers; and esters, alcohols, and acids of said oils, plasticizers, and tackifiers; and combinations thereof.

In one embodiment, the binder is selected from the group consisting of the following: polyether polyols; aliphatic hydrocarbon oils; alkanes having from 7n to 18 carbon atoms, and optionally substituted with OH, $CO_2H$, or esters; alkenes having from 7 to 18 carbon atoms, and optionally substituted with OH, $CO_2H$, or esters; natural oils; naphthenic oils; paraffinic oils; aromatic oils; silicone oils (or silicone fluids); plasticizers; tackifiers; and combinations thereof.

In one embodiment, the binder is selected from the group consisting of the following: polyether polyols; aliphatic hydrocarbon oils; alkanes having from 7 to 18 carbon atoms, and optionally substituted with OH, $CO_2H$, or esters; alkenes having from 7 to 18 carbon atoms, and optionally substituted with OH, $CO_2H$, or esters; natural oils; naphthenic oils; paraffinic oils; aromatic oils; silicone oils (or silicone fluids); and combinations thereof.

In one embodiment, the binder is a silicone oil (or silicone fluid).

In one embodiment, the composition comprises from 0.01 to 1.0 weight percent, or from 0.02 to 0.5 weight percent of the binder, based on the total weight of the composition.

In one embodiment, the binder is a siloxane polymer having the structural formula $-Si(R^1R^1)-O-$, wherein the $R^1$ groups are $C_1$-$C_{18}$ hydrocarbyl groups. In a further embodiment, $R^1$ is selected from an aliphatic group and an aromatic group. In a further embodiment, $R^1$ is methyl.

In one embodiment, the binder has a viscosity, at 25° C., from 200 to 2000 cSt, or from 250 to 1800 cSt, or from 300 to 1600 cSt, or from 350 to 1200 cSt.

In one embodiment, the composition comprises from 0.02 to 3.00 weight percent, or from 0.04 to 2.50 weight percent, or from 0.06 to 2.00 weight percent, or from 0.08 to 1.50 weight percent of the powder composition, based on the weight of the composition.

In one embodiment, the composition comprises from 0.10 to 3.00 weight percent, or from 0.20 to 2.50 weight percent, or from 0.30 to 2.00 weight percent, or from 0.30 to 1.50 weight percent, or from 0.40 to 1.50 weight percent of the powder composition, based on the weight of the composition.

In one embodiment, the composition comprises from 0.02 to 5.00 weight percent, or from 0.04 to 4.50 weight percent, or from 0.06 to 3.50 weight percent, or from 0.08 to 3.00 weight percent of the powder composition, based on the weight of the composition.

In one embodiment, the composition comprises from 0.10 to 5.00 weight percent, or from 0.20 to 4.50 weight percent, or from 0.30 to 3.50 weight percent, or from 0.40 to 3.00 weight percent, or from 0.40 to 2.50 weight percent of the powder composition, based on the weight of the composition.

In one embodiment, the composition comprises from 0.02 to 3.00 weight percent, or from 0.04 to 2.50 weight percent, or from 0.06 to 2.00 weight percent, or from 0.08 to 1.50 weight percent of the powder composition, based on the weight of the uncoated polymer particles.

In one embodiment, the composition comprises from 0.10 to 3.00 weight percent, or from 0.20 to 2.50 weight percent, or from 0.30 to 2.00 weight percent, or from 0.30 to 1.50 weight percent, or from 0.40 to 1.50 weight percent of the powder composition, based on the weight of the uncoated polymer particles.

In one embodiment, the composition comprises from 0.02 to 5.00 weight percent, or from 0.04 to 4.50 weight percent, or from 0.06 to 3.50 weight percent, or from 0.08 to 3.00 weight percent of the powder composition, based on the weight of the uncoated polymer particles.

In one embodiment, the composition comprises from 0.10 to 5.00 weight percent, or from 0.20 to 4.50 weight percent, or from 0.30 to 3.50 weight percent, or from 0.40 to 3.00 weight percent, or from 0.50 to 2.50 weight percent of the powder composition, based on the weight of the uncoated polymer particles.

In one embodiment, the total amount of organic powder plus the total amount of inorganic powder comprise ≥90 wt %, or ≥95 wt %, or ≥98 wt %, or ≥99 wt % of the total weight of the powder composition.

In one embodiment, the composition has an unconfined yield strength, at 0° C., ≤1600 lb/ft², further ≤1500 lb/ft², further ≤1400 lb/ft², further ≤1300 lb/ft², further ≤1200 lb/ft². In one embodiment, the composition has an unconfined yield strength, at 0° C., ≤1100 lb/ft², further ≤1000 lb/ft², further ≤900 lb/ft².

In one embodiment, the composition has an unconfined yield strength, at 0° C., ≤900 lb/ft², further ≤880 lb/ft², further ≤860 lb/ft². In one embodiment, the composition has an unconfined yield strength, at 0° C., ≤840 lb/ft², further ≤820 lb/ft², further ≤800 lb/ft². In one embodiment, the composition has an unconfined yield strength ≤780 lb/ft², further ≤760 lb/ft², further ≤740 lb/ft².

In one embodiment, the composition has a minimum ignition energy (MIE), without inductance, ≥240 mJ, further ≥300 mJ, further ≥400 mJ, further ≥500 mJ, further ≥600 mJ, further ≥700 mJ, further ≥800 mJ, further ≥900 mJ, further ≥1000 mJ.

In one embodiment, the composition has a minimum ignition energy (MIE), with inductance, ≥240 mJ, further ≥300 mJ, further ≥400 mJ, further ≥500 mJ, further ≥600 mJ, further ≥700 mJ, further ≥800 mJ, further ≥900 mJ, further ≥1000 mJ.

The invention also provides a process to form an inventive composition, said process comprises contacting polymer particles with a powder composition, as described herein. In a further embodiment, said process comprises contacting polymer particles with a binder to form binder coated particles, and contacting the binder coated particles with a powder composition, as described herein.

In one embodiment, the polymer particles are first contacted with the binder, and then contacted with the powder composition.

In one embodiment, the binder and the powder composition are simultaneously contacted with the polymer particles.

In one embodiment, the polymer particles are contacted with the binder and then contacted with the powder composition, as described herein, and then further contacted with the binder, the powder composition, or both the binder and the powder composition.

Also is provided an article comprising at least one component formed from an inventive composition.

Also is provided a process to form an inventive composition, said process comprising softening the polymer particles (for example, by heating said particles), and then contacting said polymer particles with the powder coating, as described herein, such that at least a portion of the powder composition is mechanically adhered to polymer particles. In a further embodiment, the powder composition is adhered to at least about 50 percent of the total surface of the polymer particles.

An inventive process may comprise a combination of two or more embodiments as described herein. An inventive composition may comprise a combination of two or more embodiments as described herein. An inventive powder composition may comprise a combination of two or more embodiments as described herein.

Polymer Particles

The term "polymer particles," as used herein, in reference to the particles that are coated with a powder composition, or binder, or binder plus powder composition, typically refers to polymer pellets, but may also refer to polymer beads, flakes, or powders. The D50 value of the polymer particles is greater that the D50 value of the powder composition, and preferably the D50 value of the polymer particles is greater than 2×, further greater than 5×, further greater than 10×, the D50 value of the powder composition, as described herein. Typical polymer particles are generally substantially platelet, spherical, cylindrical, or rod shape. While the cross-sectional area may vary, depending upon the polymer, preferably, the cross-sectional area of a polymer particle is from $3 \times 10^{-3}$ square inch ($1.93 \times 10^{-2}$ square centimeters) to 0.2 square inch (1.29 square centimeters); that is from 1/16 inch (0.15875 cm) to ½ inch (1.27 cm) in diameter, if the cross-section is, for example, circular. In one embodiment, the particles have a cross-sectional area from 0.01 square inch ($6.45 \times 10^{-2}$ square centimeters) to 0.05 square inch (0.322 square centimeters); that is from 0.125 inch (0.3175 cm) to 0.375 inch (0.9525 cm) in diameter, if, for example, the cross-section is circular. In one embodiment, are particles are from 0.25 cm to 0.40 cm in diameter.

As discussed above, the polymer particles are in the form of particulate solids, ranging in size from powders to pellets. Pellets are particulate solids, and are generally, but not exclusively, formed through extrusion and pelletization processes, with a typical average particle size (average of the longest dimension) greater than 2 mm, typically from 2 mm to 10 mm, further from 2 mm to 6 mm, and further from 2 mm to 4 mm. Micropellets typically have an average particle size less than that of a standard pellet, yet greater than those average particle sizes produced from general commercial die capabilities. The average particle size of micropellets typically range from 200 microns to 2 mm. The micropellets generally exhibit a semi-spheroidal shape.

The polymer particles may be formed from polymer compositions containing any polymer; for example, an olefin-based polymer. Exemplary olefin-based polymers include, but are not limited to, homopolymers of ethylene, and interpolymer or copolymers of ethylene and at least one ethylenically unsaturated monomer, selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids.

Exemplary olefin-based polymers further include, but are not limited to, homopolymers of propylene, and interpolymers or copolymers of propylene and at least one ethylenically unsaturated monomer, selected from the group consisting of $C_2$ and $C_4$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids.

In one embodiment, the polymer particles are formed from a polymer composition comprising an olefin-based polymer, further an olefin-based interpolymer, further an olefin-based copolymer.

In one embodiment, the polymer particles are formed from a polymer composition comprising an olefin-based polymer. In a further embodiment, the olefin-based polymer is an ethylene-based polymer, and further an ethylene-based interpolymer. Suitable ethylene-based interpolymers, include, but are not limited to, ethylene/alpha-olefin interpolymers or copolymers, for example, ethylene/$C_3$-$C_8$ alpha-olefin interpolymers or copolymers.

In one embodiment, the polymer particles are formed from a polymer composition comprising an olefin-based polymer. In a further embodiment, the olefin-based polymer is an ethylene-based polymer, and further an ethylene/α-olefin/diene terpolymers, for example ethylene/propylene/diene terpolymers.

In one embodiment, the polymer particles are formed from a polymer composition comprising an olefin-based polymer. In a further embodiment, the olefin-based polymer is selected the group consisting of ethylene-based polymers, and propylene-based polymer.

In one embodiment, the ethylene based polymer is an ethylene-based interpolymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the polymer particles are formed from a polymer composition comprising at least two olefin-based polymers, which differ in one or more of the following properties: density, Mn, Mw, MWD, comonomer type and/or comonomer content.

In one embodiment, the polymer particles are formed from a polymer composition comprising an ethylene-based polymer, further an ethylene-based interpolymer, and further an ethylene-based copolymer.

In one embodiment, the ethylene-based polymer, and further the ethylene-based interpolymer, has a density from 0.850 to 0.920 g/cc, or from 0.852 to 0.910 g/cc, or from 0.854 to 0.900 g/cc, or from 0.856 to 0.890 g/cc, or from 0.858 to 0.880 g/cc (1 cc=1 cm$^3$). In a further embodiment, the ethylene-based interpolymer is an ethylene/α-olefin interpolymer, and or an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer, and further the ethylene-based interpolymer, has a density from 0.860 to 0.920 g/cc, or from 0.865 to 0.910 g/cc, or from 0.870 to 0.900 g/cc (1 cc=1 cm$^3$). In a further embodiment, the ethylene-based interpolymer is an ethylene/α-olefin interpolymer, and or an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer, and further the ethylene-based interpolymer, has a melt index (I2, 190° C. and 2.16 kg) from 0.1 to 50 g/10 min, or from 0.5 to 40 g/10 min, or from 0.8 to 30 g/10 min. In a further embodiment, the ethylene-based interpolymer is an ethylene/α-olefin interpolymer, and or an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer, and further the ethylene-based interpolymer, has a melt index (I2, 190° C. and 2.16 kg) from 0.1 to 10 g/10 min, or from 0.5 to 8.0 g/10 min, or from 0.8 to 6.0 g/10 min. In a further embodiment, the ethylene-based interpolymer is an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer, and further the ethylene-based interpolymer, has a melt index (I2, 190° C. and 2.16 kg) from 0.1 to 5.0 g/10 min, or from 0.2 to 4.5 g/10 min, or from 0.3 to 4.0 g/10 min, or from 0.4 to 3.5 g/10 min, or from 0.5 to 3.0 g/10 min, or from 0.6 to 2.5 g/10 min, or from 0.6 to 2.0 g/10 min. In a further embodiment, the ethylene-based interpolymer is an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer, and further the ethylene-based interpolymer, has a molecular weight distribution (MWD), from 1.7 to 3.5, or from 1.8 to 3.0, or from 1.8 to 2.8, or from 1.8 to 2.5. In a further embodiment, the ethylene-based interpolymer is an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

An ethylene-based polymer may comprise a combination of two or more embodiments described herein. An ethylene-based interpolymer may comprise a combination of two or more embodiments described herein. An ethylene-based copolymer may comprise a combination of two or more embodiments described herein.

In one embodiment, the polymer particles are formed from a polymer composition comprising a propylene-based polymer, further a propylene-based interpolymer, and further a propylene-based copolymer.

In one embodiment, the propylene-based polymer, and further the propylene-based interpolymer, has a melt flow rate (MFR, 230° C. with 2.16 kg weight) from 0.1 to 50 g/10 min, or from 0.5 to 40 g/10 min, or from 1.0 to 30 g/10 min. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, the propylene-based polymer, and further the propylene-based interpolymer, has a melt flow rate (MFR, 230° C. with 2.16 kg weight) from 0.1 to 10 g/10 min, or from 0.5 to 8.0 g/10 min, or from 1.0 to 6.0 g/10 min. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, the propylene-based polymer, and further the propylene-based interpolymer, has a density from 0.860 to 0.920 g/cc, or from 0.865 to 0.910 g/cc, or from 0.870 to 0.900 g/cc (1 cc=1 cm$^3$). In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, the propylene-based polymer, and further the propylene-based interpolymer, has a molecular weight distribution (MWD) of 3.5 or less; or 3.0 or less; or from 1.8 to 3.5, or from 1.8 to 3.0. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

Examples of such propylene/alpha-olefin interpolymers and copolymers, and propylene/ethylene interpolymers or copolymers are described in U.S. Pat. Nos. 6,960,635 and 6,525,157, incorporated herein by reference. Suitable copolymers are commercially available from The Dow Chemical Company, under the tradename VERSIFY, or from ExxonMobil Chemical Company, under the tradename VISTAMAXX.

A propylene-based polymer may comprise a combination of two or more embodiments as described herein. A propylene-based interpolymer may comprise a combination of two or more embodiments as described herein. A propylene-based copolymer may comprise a combination of two or more embodiments as described herein.

In one embodiment, as discussed above, the polymer particles are formed from a polymer composition comprising an olefin-based polymer.

In one embodiment, the olefin-based polymer has a density from 0.854 to 0.945, or from 0.860 to 0.940 g/cc, or from 0.865 to 0.930 g/cc, or from 0.870 to 0.920 g/cc (1 cc=1 cm$^3$). In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, the olefin-based polymer has a crystallinity of less than 50 percent, or from 5 to 35 percent, or from 7 to 20 percent. In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, the olefin-based polymer has a melting point of less than 110° C., or from 25 to 100° C., or from 40 to 90° C. In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, the olefin-based polymer has a weight average molecular weight (Mw) greater than 20,000 g/mole, or from 20,000 to 1,000,000 g/mole, or from 50,000 to 500,000 g/mole. In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, the olefin-based polymer has a number average molecular weight (Mn) greater than 10,000 g/mole, or from 10,000 to 200,000 g/mole, or from 20,000 to 100,000 g/mole. In a further embodiment, the olefin-based polymer is an ethylene-based polymer, and further an ethylene/α-olefin interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene. In another embodiment, the olefin-based polymer is a propylene-based polymer, and further a propylene-based interpolymer. In a further embodiment, the propylene-based interpolymer is a propylene/α-olefin interpolymer, and further a propylene/α-olefin copolymer. Preferable alpha-olefins are those having from 4 to 8 carbon atoms, such as 1-butene, 1-pentene, 1-hexene, 1-heptene, and 1-octene. In another embodiment, the propylene-based interpolymer is a propylene/ethylene interpolymer, and further a propylene/ethylene copolymer.

In one embodiment, the olefin-based polymer is selected from homogeneous polymers described in U.S. Pat. No. 3,645,992, issued to Elston; high density polyethylene (HDPE), as described in U.S. Pat. No. 4,076,698, issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers, such as low density polyethylene (LDPE).

In one embodiment, the olefin-based polymer is an olefin block copolymers, for example, an ethylene multi-block copolymer, such as, for example, those described in the International Publication No. WO2005/090427 and U.S. Patent Publication No. 2006/0199930.

In one embodiment, the olefin-based polymer is a low density polyethylene (LDPE). In a further embodiment, the LDPE has a density from 0.910 to 0.925 g/cc, and a melt index (I2, 190° C. with 2.16 kg weight) from 0.1 to 100 g/10 min.

In one embodiment, the olefin-based polymer is an ethylene vinyl acetate (EVA). In another embodiments, the olefin-based polymer is an ethylene-methyl acrylate (EMA).

In one embodiment, the olefin-base polymer is an ethylene-acrylic acid (EAA) copolymer, or an ethylene-methacrylic acid copolymer.

In one embodiment, the polymer composition comprises one or more additives. Additives include, but are not limited to, antioxidants, ultraviolet absorbers, antistatic agents, colorants (e.g., titanium dioxide, carbon black and pigments), viscosity modifiers, anti-block agents, release agents, coefficient of friction (COF) modifiers, thermal stabilizers, odor modifiers/absorbents, and any combination thereof.

The polymer particles may comprise a combination of two or more embodiments described herein. A polymer composition may comprise a combination of two or more embodiments as described herein.

An olefin-based polymer may comprise a combination of two or more embodiments described herein. An olefin-based interpolymer may comprise a combination of two or more embodiments as described herein. An olefin-based copolymer may comprise a combination of two or more embodiments as described herein.

Powder Compositions

It has been discovered that the powder compositions, as described herein, are used to help reduce polymer particle blocking i.e., caking, agglomerating, aggregating and/or sticking, when such compositions are physically coated on the surface of the polymer particles in a sufficient amount. Thus, polymer particles remain substantially free-flowing even under temperatures, storage times and compression which might otherwise facilitate caking or agglomeration.

Inorganic powders include, but are not limited to, talc, mica, calcium carbonate, quartz, finely divided or fumed silica, alumina trihydrate, marble dust, cement dust, clay, feldspar, alumina, magnesium oxide, magnesium hydroxide, antimony oxide, zinc oxide, barium sulfate, aluminum silicate, calcium silicate, titanium dioxide, titanates, and chalk.

In one embodiment, the inorganic powder has D50 value less than about 100, or less than about 50, or less than about 20 microns. In one embodiment, the inorganic powder has D50 value greater than 0.5 microns, or greater than 1 microns, or greater than 2 microns.

Organic powders, useful for the present invention, include metal stearates, polymer powders and combinations thereof. Examples of polymer powders include powdered ethylene-based polymers (for example powder polyethylene homopolymers), powdered polystyrene and powdered propylene-based polymers (for example, powdered polypropylene homopolymers).

In one embodiment, the organic powder has a D50 value less than about 100 microns, or less than about 50 microns, or less than about 20 microns. In one embodiment, the organic powder has a D50 value greater than 0.5 microns, or greater than 1 microns, or greater than 2 microns.

The powder composition is typically employed in an effective amount. Effective amounts often vary, depending upon the anti-blocking agent, polymer, application process and other ingredients of the composition. Typically, an effective amount of powder composition is that amount which decreases the unconfined yield strength of the composition comprising polymer particles coated with the powder composition by at least about 20 percent, preferably by at least about 30 percent, as compared to the unconfined yield strength of a composition, similar in all respects, except it comprises the uncoated polymer particles. In many instances, the unconfined yield strength may be decreased by over 50 percent, or over 100 percent, or even 500 percent or more.

Generally, the maximum effective amount of powder composition is the greatest amount of powder composition, at which the physical properties of the polymer are not adversely affected in the desired end-use application of the polymer particles. Generally, the amount of powdered composition is less than about 5.0 weight percent, or less than about 4.0 weight percent, or less than about 3.0 weight percent, based on the total weight of the composition (comprising polymer particle plus coating).

In one embodiment, the amount of powder composition is at least 0.05 weight percent, or at least about 0.10 weight percent, or at least 0.20 weight percent, based on the total weight of the composition. In one embodiment, the amount of powder composition is at least 0.25 weight percent, or at least about 0.30 weight percent, or at least 0.35 weight percent, or at least 0.40 weight percent, or at least 0.45 weight percent, based on the total weight of the composition.

Binder

Binders are those agents that hold or fix the powdered composition to the polymer particles, such that at normal handling and shipping conditions, a majority amount of the powdered composition remains on the polymer particles. While some powdered compositions may also serve as binder, themselves, in most instances, the binder is different from the powdered composition.

The type of binder, and its effective amount, will vary, depending upon the powder composition, polymer, and other components of the composition. The preferred binders are those, in which the viscosity is not so high, such that the binder is difficult to apply. On the other hand, the viscosity should not be so low, that excessive dust from the powder composition results. Generally, oils with a viscosity in the range from 50 to 60,000 centistokes, or from 100 to 10,000 centistokes, at 25° C. are useful.

In one embodiment, the binder is selected from the group consisting of the following: silicone oils (or silicone fluids); polyether polyols; aliphatic hydrocarbon oils, such as mineral oil; and alkanes or alkenes having from seven to 18 carbon atoms, and wherein one or more carbons are optionally substituted with OH, $CO_2H$, or esters. Binders also include natural oils, such as castor, corn, cottonseed, olive, rapeseed, soybean, sunflower, other vegetable and animal oils, as well as, naphthenic, paraffinic, aromatic, and silicone oils (or silicone fluids), and esters, alcohols, and acids of said oils or their emulsions. Substances, which are often employed as plasticizers or tackifiers, may also be useful as a binder.

In one embodiment, the binder is not thermoplastic in nature.

In one embodiment, the binder is a siloxane polymer having the structural formula —Si($R^1R^1$)—O— wherein the $R^1$ groups are $C_1$-$C_{18}$ hydrocarbyl groups. Particularly preferable hydrocarbyl groups include aliphatic and aromatic groups. A particularly preferable group for $R^1$ is a methyl group. These materials are commercial available from Dow Corning.

The binder may be employed in purified form, in solutions, emulsions or in mixtures. Mixing of the powder composition and the polymer particles should be kept to a minimum, especially when using non-thermoplastic binders. Too much mixing may result in surface segregation, resulting in non-homogeneous layers.

Inventive Processes

In one embodiment, a binder is used to bind the powder composition to the polymer particles. In another embodiment, the powder composition is bound to the polymer particles, without the use of a binder.

In one embodiment, the process of forming the compositions of the instant invention comprises contacting the polymer particles with a binder and with a powder composition. The polymer particles may be contacted with powder composition, either before, after, or simultaneously with, the binder. In any event, both the binder and the powder composition should be contacted with the polymer particles, under conditions such that the polymer particles can be sufficiently physically coated with the desired agent or agents.

Preferably, such contacting is conducted by a first liquid feeding of part, or all, of the binder, onto the polymer particles, or immersing the polymer particles in part, or all, of the binder. The powder composition is then distributed onto the polymer particles that are pre-coated with the binder. The means of contacting and distributing may vary, so long as the polymer particles become sufficiently coated with the powder composition, such that the powder composition is adhered to the surface of the polymer particles, and the particles with the desired unconfined yield strength are obtained. Usually, the process is sufficient, so long as the average amount of surface coating is above about 50 percent, and preferably above about 60 percent, or above 80 percent, based on the total surface area of the polymer particles.

In one embodiment, the thickness of the coating, formed from the powder composition, is from 1.0 microns to 150 microns, or from 5.0 microns to 100 microns, or from 10 microns to 50 microns. This value may also be expressed in terms of percent increase in the average size of the polymer particles (for example, pellets). This percent increase is generally from 0.01 percent to 15 percent, depending on amount of powder composition, and the type of method used to apply, and process, the coating.

Examples of blending equipment/processes include any mechanical means of moving the polymer particles, such as, for example, a simple tumbling of a jar, or blending in a conical rotating vessel, ribbon blender, drum tumbler, paddle blender, agglomeration pan and fluidized bed operations. In one embodiment, the coating process includes the use of a pneumatic conveyor, under air or inert gas. Moderate stirring, shaking, or even a short distance of conveying in a screw conveyor, can be sufficient for such adequate distribution of the agent or agents. The type of contacting employed may be the same, or different, for the binder and the powder composition, if the polymer particles are contacted with the binding agent and powder composition at separate times.

The contacting of the agents (binder and/or powder composition) and the polymer particles can be conducted at any temperature, at which an agent does not evaporate, solidify, become too viscous, or significantly react with the polymer particles. Such temperatures often vary, depending upon the components of the composition, but typically are from −10° C. to 150° C., further from 0° C. to 60° C., or from 5° C. to 35° C.

In some situations, it may not be desirable to employ a binder. Such situations include, for example, when the binder will interfere with the end-use application of the polymer particles. Also, in some situations, it may be desirable to minimize the amount of powder composition. In this manner, the unassociated environmental dust (from the powder composition) can be minimized. It also advantageous to reduce the amount of powder composition, if, for example, films are being made from the final composition, and optical properties are important.

The compositions that do not require a binder, employ the same types of polymer particles and powder compositions as discussed above. In one embodiment, the amount of powder composition can be reduced to less than 3.0, or less than 2.0, or less than about 1.5, or less than about 0.5, or less than about 0.3 percent by weight of the composition. Correspondingly, the effective amount of powder composition is typically at least a 0.08, or at least about 0.1, or at least about 0.15 percent by weight of the composition.

In one embodiment, the powder composition is mechanically adhered to the polymer particles. In one embodiment, the process comprises mechanically adhering an effective amount of powder composition to more than about 40 percent, further more than about 50 percent, further more than about 60 percent of the polymer particles. In this manner, polymer particles, which have an effective amount of adhered powder composition, will serve as a barrier to prevent large numbers of polymer particles that do not have an effective amount of adhered powder composition, from agglomerating or blocking. The depth to which the particle is embedded, and the amount of powder composition, will determine the thickness of the powder composition layer on the polymer particles. This thickness will, of course, also vary, depending upon the type of polymer, the size of the particles, the type of powder composition, and the desired amount of powder composition, as determined by unconfined yield strength. These coating features can be measured, for example, by scanning electron microscopy (SEM).

The powder composition can be mechanically adhered to the polymer particles in any way. This may be accomplished simultaneously with, or subsequent to, the particle formation. One way in which this can be accomplished is, for example, by impact coating the polymer particles, such that the desired amount of powder composition is adhered to the desired amount of polymer particles. This can be facilitated by the use of steam.

Another way to mechanically adhere powder composition is to soften the polymer particles either before, simultaneously with, or after, contacting the polymer particles with the powder composition. The softening may be done in any manner, so long as the surface is softened sufficiently to adhere an effective amount of the powder composition to the exterior surface of the polymer particles. However, the polymer particles must not be softened so much that there are no longer discrete particles, that is, the polymer particles should not become melted or adhered together. In general, one can usually observe (for example, visual observation) the surface of the polymer particles becoming slightly tacky, and ready for coating. The point at which this occurs, will vary by polymer and the type of powder composition employed. The choice of softening method will vary, depending upon the type of polymer, type of powder composition, and the desired results. Generally, heating by hot air, radiation (UV, IR, visible), contact heating, or a combination thereof, may be employed. In general, one can usually observe when the particles have been heated sufficiently, because the surface of the polymer particles will become slightly tacky and ready for coating. As discussed, the point, at which this occurs, will vary by the type of polymer, the size of the particles, and the type of powder composition employed.

Articles

The invention also provides an article comprising at least one component formed from an inventive composition. Article include, but are not limited to, injection molded articles, thermoformed articles and foams. Additional articles include medical devices (e.g., pressure cuffs and stabilization devices); inflatable articles (e.g., toys, watercraft, cushioning and furniture), sheetings (e.g., awnings, banners, signs, tents, tarpaulins, and liners for pools, ponds or landfills), book bindings, and carriers (e.g., sporting bags and backpacks). Additional articles include automotive parts.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, a majority amount of olefin monomer, for example ethylene or propylene, (based on the weight of the polymer), and optionally may comprise one or more comonomers.

The term, "olefin-based interpolymer," as used herein, refers to an interpolymer that comprises, in polymerized form, a majority amount of olefin monomer, for example ethylene or propylene, (based on the weight of the interpolymer), and one or more comonomers.

The term, "olefin-based copolymer," as used herein, refers to an copolymer that comprises, in polymerized form, a majority amount of olefin monomer, for example ethylene or propylene, (based on the weight of the copolymer), and one comonomer, as the only two monomer types.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene-based interpolymer," as used herein, refers to an interpolymer that comprises, in polymerized form, a majority amount of ethylene monomer (based on the weight of the interpolymer), and one or more comonomers.

The term "ethylene/α-olefin interpolymer," as used herein, refers to an interpolymer that comprises, in polymerized form, a majority amount of ethylene monomer (based on the weight of the interpolymer), and at least one α-olefin.

The term, "ethylene-based copolymer," as used herein, refers to a copolymer that comprises, in polymerized form, a majority amount of ethylene monomer (based on the weight of the copolymer), and one comonomer, as the only two monomer types.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "ethylene/α-olefin/diene interpolymer," as used herein, refers to an interpolymer that comprises, in polymerized form, ethylene monomer, an α-olefin, and a diene. Typically, the "ethylene/α-olefin/diene interpolymer," comprises, in polymerized form, a majority amount of ethylene monomer, based on the weight of the interpolymer.

The term, "propylene-based polymer," as used herein, refers to a polymer that comprises, in polymerized form, a majority amount of propylene monomer (based on the weight of the polymer), and optionally may comprise one or more comonomers.

The term, "propylene-based interpolymer," as used herein, refers to an interpolymer that comprises, in polymerized form, a majority amount of propylene monomer (based on the weight of the interpolymer), and one or more comonomers.

The term, "propylene-based copolymer," as used herein, refers to a copolymer that comprises, in polymerized form, a majority amount of propylene monomer (based on the weight of the copolymer), and one comonomer, as the only two monomer types.

The term "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term "propylene/ethylene interpolymer," as used herein, refers to an interpolymer that comprises, in polymerized form, a majority amount of propylene monomer (based on the weight of the interpolymer), and at least ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The term, "inorganic powder," as used herein, refers to a chemical compound that does not contain the element carbon, with the exception of oxides of carbon, for example, calcium carbonate, and sulfides of carbon, for example, carbon disulfide.

The term, "organic powder," as used herein, refers to a chemical compound that contains the element carbon, with the exception of oxides of carbon, for example, calcium carbonate, and sulfides of carbon, for example, carbon disulfide.

The term "polymer powder," as used herein, in reference to a powder composition, refers to fine polymer particles that have a D50 value less than the D50 value of the polymer particles. Typically, the polymer powder has a D50 value ≤200 microns, and further a D50 value ≤150 microns, further a D50 value ≤100 microns.

As used herein "mechanically adhered," as used herein, refers to the physically bound particles of the powder composition onto the polymer particles; for example the particles of the powder composition are embedded into the surfaces of the polymer particles.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density is measured according to ASTM D792 (ASTM D4703, A1 Proc C, test within 1 hr).

Melt index ($I_2$) of an ethylene-based polymer is measured at 190° C. under a load of 2.16 kg according to ASTM D-1238. Melt index ($I_5$) is measured at 190° C. under a load of 5 kg according to ASTM D-1238. Melt index ($I_{10}$) is measured at 190° C. under a load of 10 kg according to ASTM D-1238. Melt index ($I_{21}$) is measured at 190° C. under a load of 21.6 kg according to ASTM D-1238. The melt flow rate (MFR) of an propylene-based polymer is measured in accordance with ASTM D-1238, condition 230° C./2.16 kg.

Particle Size Distribution (D50, D10, D90)

The particle size distribution can be measured using a Beckman Coulter LS 13 320 Laser Diffraction Particle Size Analyzer, equipped with the universal liquid module. This instrument uses the principles of light scattering, where the angular pattern of light, scattered by the particles, is measured. This scattered light pattern is then fed to a deconvolution algorithm to obtain a size distribution. This equipment works on physics first principle, and therefore is not calibrated. The scattering pattern can be affected by the complex refractive index of particles and by that of the surrounding medium, so for maximum accuracy, the complex index of refraction of the particles, and the suspending media, are taken into account by the model. The complex index of refraction consists of a real part and an imaginary part. The real part is characterized by the bending of light, as it propagates from one medium to another, and the imaginary, or complex part, represents the absorption coefficient of the material. The index of refraction used in the size distribution measurement was 1.46+0.05i for Calcium Stearate, and 1.57+0.05 for Talc. Guidelines for selection of index of refraction can be found in the LS 13 320 operation manual, provided by Beckman Coulter (Florida, USA). The sample (particles) is suspended in isopropyl alcohol, and then sonicated for five minutes in a sonic bath (Fisher Scientific model FS-14), and then injected into the universal liquid module, which is operated at a pumping speed of 50. The volume median diameter (D50, typically in micron) is defined as the particle diameter where half of the volume distribution resides above this point, and half resides below this point. The D10 is defined as the particle diameter where 10% of the volume distribution lies below this point (D10). The D90 is defined as the particle diameter where 90% of the volume distribution lies below this point (D90). The mass distribution can be calculated by multiplying by the density of the particles.

The following examples illustrate the present invention but are not intended to limit the scope of the invention.

EXAMPLES

I. Materials

Polymer: ENGAGE 7467 (I2=1.0-1.4 g/10 min; density=0.859-0.865 g/cc), available from The Dow Chemical Company.

Polymer: ENGAGE 8842 (I2=0.75-1.25 g/10 min; density=0.854-0.860 g/cc), available from The Dow Chemical Company.

Polymer: NORDEL 4785 (Mooney Viscosity (ML 1+4, 125° C.; majority wt % ethylene), available from The Dow Chemical Company.

Inorganic Powder: Talc: TALCRON MP 10-52 available from Specialty Minerals.

Organic Powder: Calcium Stearate (CaSt): SYNPRO™ CaSt 500B, available from Valtrus.

Binder: Polydimethylsiloxane (XIAMETER PMX-200 Silicone Fluid—350 cSt at 25° C.)—PDMS 350; currently available from The Dow Chemical Company.

Binder; Polydimethylsiloxane (XIAMETER PMX-200 Silicone Fluid—1000 cSt at 25° C.)—PDMS 1000, currently available from The Dow Chemical Company.

II. Powder Compositions

Method of blending: Two powders (talc and CaSt) were dry blended at room temperature, in a container, with a handheld high speed mixer with a turbine impeller, for at least 15 minutes, to form a homogeneous mixture. The mixing action was both convective and high shear. The batch size was 100 grams. The densities of five random samples, weighing 0.3 grams each, were measured, using a nitrogen pycnometer (Model Micromeritics AccuPyc II 1340). Each sample met the Equation A below. Powder Compositions are listed below in Table 1.

$$W=15.336\rho^3-118.15\rho^2+328.62\rho-232.82 \qquad \text{Eqn. A}$$

($R^2$=0.9997), where, W=weight % of Talc in mixture of Calcium Stearate and Talc, and p=density of the mixture, in g/cm$^3$, as measured by the nitrogen pycnometer.

TABLE 1

Powder Compositions

| Powder Composition | Talc (wt %) | CaSt (wt %) | Weight Ratio of Talc/CaSt |
|---|---|---|---|
| PC A | 0 | 100 | 0.0 |
| PC B | 50 | 50 | 1.0 |
| PC C | 55 | 45 | 1.2 |
| PC D | 60 | 40 | 1.5 |
| PC E | 70 | 30 | 2.3 |
| PC 1 | 75 | 25 | 3.0 |
| PC 2 | 80 | 20 | 4.0 |
| PC 3 | 83.3 | 16.7 | 5.0 |
| PC 4 | 90 | 10 | 9.0 |
| PC 5 | 95 | 5 | 19.0 |
| PC 6 | 96 | 4 | 24.0 |
| PC 7 | 97 | 3 | 32.3 |
| PC 8 | 97.5 | 2.5 | 39.0 |
| PC 9 | 98 | 2 | 49.0 |
| PC F | 98.5 | 1.5 | 65.7 |
| PC G | 99 | 1 | 99.0 |
| PC H | 100 | 0 | ∞ |

III. Polymer Coating

A. Powder Composition Only

Uncoated ("as is") pellets (2500 grams, for example, ENGAGE 7467) were mixed in a large bag (5 gallon) with addition of a Powder Composition, in increments of 25 wt % of Powder Composition, based on total weight of the target coating level of the Powder Composition. The contents of the bags were mixed for one minute between each addition. The mixing action in the bag was mechanistically similar to a paddle mixer, with convective and shear mixing. The coating level can ranged from 1000 ppm to 20,000 ppm, based on weight of the uncoated polymer pellets. The compositions are shown in Table 2 below.

TABLE 2

Coatings Without Binder

| Composition | Amount of PC (ppm) | PC |
|---|---|---|
| 1 | 4500 | PC 2 |
| 2 | 4500 | PC 1 |
| A | 4500 | PC G |
| B | 4500 | PC H |

B. Binder and Powder Composition

Pellets (2500 grams, for example, ENGAGE 7467) were first coated with a polydimethylsiloxane oil (binder) by spraying, while tumbling in a batch drum mixer (25½" diameter and 6¼" long), at room temperature (RPM=8). The sprayed pellets were tumbled until the pellets were substantially coated with the binder. The oil coated pellets were then transferred to a large bag (5 gallon), and the Powder Composition was added in increments of 25 wt % of Powder Composition, based on total weight of the target coating level of the Powder Composition. The contents of the bags were mixed for one minute between each addition. The mixing action in the bag was mechanistically similar to a paddle mixer with convective and shear mixing. The polydimethylsiloxane amount can ranged from 200 ppm to 10,000 ppm, based on the weight of the uncoated polymer pellets; and Powder Composition can ranged from 0 ppm (no PC) to 20,000 ppm, based on the weight of the uncoated polymer pellets. Compositions are shown in Table 3 below.

TABLE 3

Coating With Binder

| Composition | Amount of Binder (ppm) | Binder | Amount of PC (ppm) | PC |
|---|---|---|---|---|
| 3 | 250 | PDMS - 350 | 6000 | PC 2 |
| C | 250 | PDMS - 350 | 4500 | PC H |
| D | 250 | PDMS - 350 | 0 | — |

IV. Blocking Force
Test Method—Unconfined Yield Strength

A sufficient amount of coated pellets (inventive or comparative composition) was loaded into a 2" diameter (ID) cylinder, with a height to diameter ratio of 2.5, such that the level of coated pellets was flush with the top of the cylinder (typically 100-120 grams coated pellets). The cylinder was made up of two halves held together, in the vertical dimension, by a hose clamp. The pellets were subjected to a consolidation stress of 195 lb/ft² at 37° C. (static oven, ambient atmosphere). A higher temperature setting of 42° C. was used for accelerated testing. The pellets remained under this consolidated stress for 2 or 4 weeks. The cylinder was then removed from the oven; the consolidation load was removed, and the pellets (in the cylinder) allowed to cool overnight, in an environmental chamber, set at 0° C., ambient atmosphere, to obtain a final sample of consolidated pellets. The cylinder was placed on the platform of an INSTRON test machine. The two halves of the split cylinder were separated, after removing the hose clamp. If the pellets in the consolidated sample were totally free-flowing, the pellets will not hold the form of a cylinder, and will simply collect into a pile. If the consolidated mass of pellets does hold the form of a cylinder, an INSTRON machine was used to measure the maximum force required to crush the cylinder. The consolidated pellets were crushed using an INSTRON 5543 frame, to measure the maximum force required to break the "cylinder form" of the consolidated pellets. The consolidated pellets were positioned in the INSTRON in the vertical direction—longer dimension is the vertical direction. A constant strain rate of 2 mm/min was used for this test. To ensure data consistency, each composition (coated pellets) was measured twice, and the average reported.

The unconfined yield strength (UYS) was calculated as follows: UYS=Peak force/cross-section area of cylinder. The UYS is an indication of blocking force (the greater the unconfined yield strength, the greater the blocking force). A zero value corresponds to free-flowing pellets.

Example 1—Coating with Powder Composition Only

Uncoated pellets of ENGAGE 7467 (ethylene/butene copolymer (EB)) were coated with Powder Compositions "PC 2" and "PC 1" as described earlier. The pellets were subjected to pellet blocking test using the procedure outlined above. For comparative composition A, the experiment was conducted in the same manner, except Powder Composition "PC G" was used. For comparative composition B, the experiment was conducted in the same manner, except Powder Composition "PC H" was used. The results are summarized in Table 4. As seen in Table 4, the inventive compositions 1 and 2 had considerably lower "unconfined yield strength" (UYS) value, and thus, lower blocking force, as compared to the comparative compositions A and B.

TABLE 4

Compositions (no Binder)

| Composition | Amount of PC (ppm) | PC | Unconfined Yield Strength (lb/ft²) measured at 0° C. |
|---|---|---|---|
| 1 | 4500 | PC 2 | 683 |
| 2 | 4500 | PC 1 | 873 |
| A | 4500 | PC G | 947 |
| B | 4500 | PC H | 1051 |

Consolidation temperature = 37° C.; Consolidation time = 4 weeks.
Each ppm based on weight of un-coated pellets Example 2—Coating with Binder and Powder Composition Uncoated pellets of ENGAGE 7467 were coated first with the binder (polydimethylsiloxane), and then with Powder Compositions "PC 2" as described earlier. The pellets were subjected to pellet blocking test, using the procedure outlined above. For comparative composition C, the experiment was conducted in the same manner as Composition 3, except Powder Composition "PC H" was used as a reference. For comparative compositions D, the experiment was conducted in the same manner as Composition 3, except no powder coating was added. The results are summarized in Table 5. As seen in Table 5, the inventive composition 3 had considerably lower "unconfined yield strength" (UYS) value, and thus, lower blocking force, as compared to the comparative compositions C and D.

TABLE 5

Compositions (With Binder and Powder Composition)

| Composition | Amount of Binder (ppm) | Binder Viscosity (cSt) | Amount of PC (ppm) | PC | Unconfined Yield Strength (lb/ft²) measured at 0° C. |
|---|---|---|---|---|---|
| 3 | 250 | 350 | 6000 | PC 2 | 563 |
| C | 250 | 350 | 4500 | PC H | 792 |
| D | 250 | 350 | 0 | — | 1608 |

Consolidation temperature = 37 C.; Consolidation time = 4 weeks.
Each ppm based on weight of un-coated pellets.

Example 3—Coating with Powder Composition Only

Uncoated pellets of ENGAGE 7467 (ethylene/butene copolymer (EB)) were coated with Powder Compositions "PC 3" using the procedure discussed above. The pellets were subjected to pellet blocking test, using the procedure discussed above. For comparative composition B, the experiment was conducted in the same manner, except Powder Composition "PC H" was used. The results are summarized in Table 6. As seen in Table 6, the inventive composition 4 had considerably lower "unconfined yield strength" (UYS) value, and thus, lower blocking force, as compared to the comparative composition B.

TABLE 6

Compositions (no Binder, Powder Composition Only)

| Composition | Amount of PC (ppm) | PC | Unconfined Yield Strength (lb/ft²) measured at 0° C. |
|---|---|---|---|
| 4 | 4500 | PC 3 | 683 |
| B | 4500 | PC H | 1051 |

Consolidation temperature = 37° C.; Consolidation time = 4 weeks.
Each ppm based on weight of un-coated pellets.

Example 4—Coating with Powder Composition Only

Uncoated pellets of NORDEL 4785 (EPDM) were coated with the powder compositions as shown in Table 7 using the procedure discussed above. The pellets were subjected to pellet blocking test, using the procedure discussed above. Comparative compositions (E, F and G) were coated and tested in the same manner. As seen in Table 7, the inventive compositions 5, 6, 7, 8, 9 and 10 have lower "unconfined yield strength" value than comparative composition E, while still exhibiting ignition resistant characteristics. Comparative examples F and G are coated with combustible powder compositions.

TABLE 7

Compositions (no Binder, Powder Composition Only) With NORDEL 4785

| Composition | Amount of PC (ppm) | PC | Unconfined Yield Strength (lb/ft²) measured at 0° C. | Wt ratio of talc to CaSt | Dust Explosion Characteristics |
|---|---|---|---|---|---|
| E | 4500 | PC F | 1311 | 66.0 | Ignition resistant* |
| 5 | 4500 | PC 9 | 1267 | 49.0 | Ignition resistant |
| 6 | 4500 | PC 8 | 1231 | 39.0 | Ignition resistant |
| 7 | 4500 | PC 6 | 1225 | 24.0 | Ignition resistant |
| 8 | 4500 | PC 5 | 1170 | 19.0 | Ignition resistant |
| 9 | 4500 | PC 4 | 1127 | 9.0 | Ignition resistant |
| 10 | 4500 | PC 2 | 1007 | 4.0 | Ignition resistant |
| F | 4500 | PC E | 867 | 2.3 | Combustible** |
| G | 4500 | PC C | 889 | 1.2 | Combustible |

*Ignition resistant MIE ≥ 1000 mJ (without inductance).
**Combustible: MIE < 300 mJ (without inductance).
Consolidation temperature = 37° C.; Consolidation time = 4 weeks.
Each ppm based on weight of un-coated pellets.

Example 5—Coating with Binder and Powder Composition

Uncoated pellets of ENGAGE 8842 (ethylene/octene copolymer (EO)) were coated with the binder and then the powder compositions as shown in Table 8, using the procedure discussed above. The pellets were subjected to pellet blocking test, using the procedure discussed above. Accelerated test condition (oven temperature of 42° C.) was chosen for these tests. As seen in Table 8, the inventive compositions 11-17 have lower "unconfined yield strength" value than comparative composition H, and still exhibit ignition resistant characteristics. The powder compositions for comparative compositions I and J are combustible.

TABLE 8

Compositions (with binder and powder composition) with ENGAGE 8842

| Composition | Amt of Binder (ppm) | Binder Viscosity (cSt) | Amount of PC (ppm) | PC | Unconfined Yield Strength (lb/ft²) measured at 0° C. | Wt ratio of talc to CaSt | Dust Explosion Characteristics |
|---|---|---|---|---|---|---|---|
| H | 250 | 350 | 4500 | PC F | 1349 | 66.0 | Ignition resistant* |
| 11 | 250 | 350 | 4500 | PC 9 | 1263 | 49.0 | Ignition resistant |
| 12 | 250 | 350 | 4500 | PC 8 | 1208 | 39.0 | Ignition resistant |
| 13 | 250 | 350 | 4500 | PC 7 | 1083 | 32.0 | Ignition resistant |
| 14 | 250 | 350 | 4500 | PC 6 | 1056 | 24.0 | Ignition resistant |
| 15 | 250 | 350 | 4500 | PC 5 | 920 | 19.0 | Ignition resistant |
| 16 | 250 | 350 | 4500 | PC 4 | 674 | 9.0 | Ignition resistant |

TABLE 8-continued

Compositions (with binder and powder composition) with ENGAGE 8842

| Composition | Amt of Binder (ppm) | Binder Viscosity (cSt) | Amount of PC (ppm) | PC | Unconfined Yield Strength (lb/ft²) measured at 0° C. | Wt ratio of talc to CaSt | Dust Explosion Characteristics |
|---|---|---|---|---|---|---|---|
| 17 | 250 | 350 | 4500 | PC 2 | 654 | 4.0 | Ignition resistant* |
| I | 250 | 350 | 4500 | PC E | 622 | 2.3 | Combustible** |
| J | 250 | 350 | 4500 | PC C | 718 | 1.2 | Combustible |

*Ignition resistance MIE ≥ 1000 mJ (without inductance).
**Combustible: MIE < 300 mJ (without inductance).
Consolidation temperature = 42° C.;
Consolidation time = 4 weeks.
Each ppm based on the weight of the uncoated pellets.

Example 6—Coating with Powder Composition Only

Uncoated pellets of ENGAGE 8842 (ethylene/octene copolymer (EO)) were coated with the powder compositions as shown in Table 9, using the procedure discussed above. The pellets were subjected to pellet blocking test, using the procedure discussed above. As seen in Table 9, the inventive compositions 18-23 have lower "unconfined yield strength" value than comparative composition K, and still exhibit ignition resistant characteristics. The powder compositions for comparative compositions L and M are combustible.

TABLE 9

Compositions (with powder composition only) ENGAGE 8842

| Composition | Amount of PC (ppm) | PC | Unconfined Yield Strength (lb/ft²) measured at 0° C. | Wt ratio of talc to CaSt | Dust Explosion Characteristics |
|---|---|---|---|---|---|
| K | 3000 | PC F | 1656 | 66.0 | Ignition resistant* |
| 18 | 3000 | PC 9 | 1599 | 49.0 | Ignition resistant |
| 19 | 3000 | PC 7 | 1431 | 32.0 | Ignition resistant |
| 20 | 3000 | PC 6 | 1389 | 24.0 | Ignition resistant |
| 21 | 3000 | PC 5 | 1233 | 19.0 | Ignition resistant |
| 22 | 3000 | PC 4 | 1148 | 9.0 | Ignition resistant |
| 23 | 3000 | PC 2 | 1101 | 4.0 | Ignition resistant |
| L | 3000 | PC E | 920 | 2.3 | Combustible** |
| M | 3000 | PC C | 928 | 1.2 | Combustible |

Consolidation temperature = 42° C.; Consolidation time = 2 weeks.
*Ignition resistance MIE ≥ 1000 mJ (without inductance).
**Combustible: MIE < 300 mJ (without inductance).
Each ppm based on the weight of the uncoated pellets.

Example 7—Coating with Powder Composition Only

Uncoated pellets of ENGAGE 8842 (ethylene/octene copolymer (EO)) were coated with the powder compositions as shown in Table 10 using the procedure discussed above. The pellets were subjected to pellet blocking test, using the procedure discussed above. As seen in Table 10, the inventive compositions 24-29 have lower "unconfined yield strength" (UYS) value than comparative composition N, and still exhibit ignition resistant characteristics. The powder compositions for comparative compositions O and P are combustible.

TABLE 10

Compositions (with powder composition only) ENGAGE 8842

| Composition | Amount of PC (ppm) | PC | Unconfined Yield Strength (lb/ft²) measured at 0° C. | Wt ratio of talc to CaSt | Dust Explosion Characteristics |
|---|---|---|---|---|---|
| N | 4500 | PC F | 1084 | 66.0 | Ignition resistant* |
| 24 | 4500 | PC 9 | 1002 | 49.0 | Ignition resistant |
| 25 | 4500 | PC 7 | 988 | 32.0 | Ignition resistant |
| 26 | 4500 | PC 6 | 961 | 24.0 | Ignition resistant |
| 27 | 4500 | PC 5 | 950 | 19.0 | Ignition resistant |
| 28 | 4500 | PC 4 | 830 | 9.0 | Ignition resistant |
| 29 | 4500 | PC 2 | 779 | 4.0 | Ignition resistant |
| O | 4500 | PC E | 791 | 2.3 | Combustible** |
| P | 4500 | PC C | 719 | 1.2 | Combustible |

Consolidation temperature = 42° C.; Consolidation time = 2 weeks.
*Ignition resistance MIE ≥ 1000 mJ (without inductance).
**Combustible: MIE < 300 mJ (without inductance).
Each ppm based on the weight of the uncoated pellets.

Example 8—Coating with Binder and Powder Composition

Uncoated pellets of NORDEL 4785 (EPDM) were coated with the binder, and then the powder compositions shown in Table 11, using the procedure discussed above. The pellets were subjected to pellet blocking test, using the procedure discussed above. Accelerated test condition (oven temperature of 42° C.) was chosen for these tests. As seen in Table 11, the inventive compositions 30-35 have lower "unconfined yield strength" value than comparative composition Q, and still exhibit ignition resistant characteristics. The powder compositions for comparative compositions R and S are combustible.

TABLE 11

Compositions (with binder and powder composition) With NORDEL 4785

| Composition | Amt of Binder (ppm) | Amount of PC (ppm) | PC | Unconfined Yield Strength (lb/ft$^2$) measured at 0° C. | Wt ratio of talc to CaSt | Dust Explosion Characteristics |
|---|---|---|---|---|---|---|
| Q  | 250 | 4500 | PC F | 1128 | 66.0 | Ignition resistant* |
| 30 | 250 | 4500 | PC 9 | 1098 | 49.0 | Ignition resistant |
| 31 | 250 | 4500 | PC 8 | 1101 | 39.0 | Ignition resistant |
| 32 | 250 | 4500 | PC 6 | 1007 | 24.0 | Ignition resistant |
| 33 | 250 | 4500 | PC 5 | 929  | 19.0 | Ignition resistant |
| 34 | 250 | 4500 | PC 4 | 802  | 9.0  | Ignition resistant |
| 35 | 250 | 4500 | PC 2 | 686  | 4.0  | Ignition resistant |
| R  | 250 | 4500 | PC E | 710  | 2.3  | Combustible** |
| S  | 250 | 4500 | PC C | 744  | 1.2  | Combustible |

Consolidation temperature = 42° C.;
Consolidation time = 2 weeks.
*Ignition resistance MIE ≥ 1000 mJ (without inductance).
**Combustible: MIE < 300 mJ (without inductance). Each ppm based on the weight of the uncoated pellets.

V. Minimum Ignition Energy Measurement

Regulations and guidance, related to handling of combustible dusts, discuss the need to eliminate sources of electrical energy (termed "ignition sources") sufficient to ignite a suspended combustible dust in air (NFPA 654, NFPA 499, OSHA SHIB 073105, ATEX Directive 94/9/EC). Different ignition sources have varied levels of energy release possible. The types of ignition sources that must be eliminated depend on the sensitivity of the dust to ignition. This ignition sensitivity can be quantified by the Minimum Ignition Energy, MIE. Many of the most common ignition sources, such as electrostatic discharges from human handling, have ignition energies of less than 300 mJ (Britton, L.). These types of ignition sources can be very challenging to completely eliminate. More energetic ignition sources, such as sparks from welding, high energy electrical discharges, open flames, and large, high-temperature hot surfaces, are much easier to identify and protect against.

It has been discovered that the inventive compositions have reduced ignition sensitivity, hence increased MIE. As used herein, "reduced ignition sensitivity" refers to dust mixtures with MIE values greater than 300 mJ, preferably greater than 600 mJ, more preferably greater than 1000 mJ.

The Minimum Ignition Energy (MIE) of a combustible solid powder is the lowest electrical energy stored in a capacitor, which, when released as a high voltage spark, is just sufficient to ignite the dust cloud (from the powder composition) at its most readily ignitable concentration in air. For this test, each powder composition was made in-situ. MIE determination was done in a vertical glass tube, within which, the powder sample was dispersed with compressed air. A set of electrodes, with adjustable spacing, were situated in the center of the tube, and were used to generate a discharge with a specified, discreet energy, in millijoules (mJ). The dust concentration, the energy of the discharge, and the ignition delay time (affects turbulence level at the time of the ignition) were varied, in such a way, that the lowest discharge energy that was capable of igniting a cloud of the dust in air was determined. The circuit that produces the electrostatic discharge, creates a spark that is nearly pure capacitive in nature, however a small inductance can optionally be included in the circuit. Such tests "with inductance" will generally produce lower MIE values, which are conservative with respect to evaluating hazards associated with normal electrostatic discharges from bodies or equipment; however such test is only necessary for evaluating hazards where inductive discharges could be generated (for example, motors, generators, long cables, etc.).

The powder compositions were tested for their MIE's using a Kuhner A. G. MIKE3 "Minimum Ignition Energy Apparatus," and the MIKE3.4 software. The "MIKE3 is a "1.2 L modified Hartmann tube flammability apparatus" with the capability of measuring MIE values from 1 mJ to 1000 mJ. Measurements were made per ASTM Test Method E2019 with inductance (inductance test circuit used; inductance=1 mH) and without inductance (used same test circuit without inductance). For each powder composition, the MIE testing was done at discreet energy levels (1, 3, 10, 30, 100, 300, 1000 mJ). The minimum ignition energy (MIE) lies between the highest energy level, at which ignition fails to occur in ten successive attempts to ignite the dust-air mixture (MIE Upper Bound), and the lowest energy level, at which ignition occurs at least once within up to ten successive attempts (MIE Lower Bound). A statistical method, included in the MIKE3.4 software, was used for estimating the MIE within that range. The estimated MIE and the upper and lower bounds are reported in Tables 12 and 13. More information on the statistical method can be found in Cesana et al.—section 1.3.2. MIE without inductance was measured across the entire compositional range of calcium stearate/talc mixtures from 0 wt % to 100 wt % talc, based on the sum weight of the calcium stearate and talc. The calcium stearate used in this series of tests was SYNPRO CaSt 500B, which has a measured D50 of 8.54 micron. Both the calcium stearate and the talc were passed through a 230 mesh sieve (63 micron), effectively removing any particles larger than 63 micron, prior to blending. To avoid mixture compositional variation from test to test, each test sample (powder composition) was blended in-situ, after weighing out the components on an analytical balance. The MIE of combustible dusts has been shown to increase when moisture content exceeds 5 wt % of the dust mass (Cesana, et. al.) and both the American and European MIE standards require reporting of the moisture content of dusts for which the MIE is measured (ASTM E2019, EN 13821). Prior to the test, the moisture content in the calcium stearate and talc samples was determined via thermogravimetric analysis (TA Instruments Q500 TGA) to be approximately 3.19 wt % and 0.26 wt %, respectively, based on the total weight of the powder composition.

The measured MIE values are summarized in Table 12 (MIE without inductance) and Table 13 (MIE with 1 mH inductance). With the particular grades of Calcium Stearate and Talc tested, the threshold where the MIE exceeds 300 mJ was 75 wt % talc, without inductance, and was 80 wt % talc with 1 mH of inductance in the circuit. Therefore, a powder composition with higher weight % of talc can be considered insensitive to ignition.

TABLE 12

(MIE without inductance)

| Composition | Powder Composition | MIE, mJ | MIE Lower Bound, mJ | MIE Upper Bound, mJ |
|---|---|---|---|---|
| T | PC A | 15 | 10 | 30 |
| U | PC B | 86 | 30 | 100 |
| V | PC D | 200 | 100 | 300 |
| W | PC E | 240 | 100 | 300 |
| 36 | PC 1 | >1000 | >1000 | >1000 |
| 37 | PC 2 | >1000 | >1000 | >1000 |
| X | PC H | >1000 | >1000 | >1000 |

TABLE 13

(MIE with inductance)

| Composition | Powder Composition | MIE, mJ | MIE Lower Bound, mJ | MIE Upper Bound, mJ |
|---|---|---|---|---|
| Y | PC 1 | 240 | 100 | 300 |
| 38 | PC 2 | >1000 | >1000 | >1000 |
| Z | PC H | >1000 | >1000 | >1000 |

REFERENCES

National Fire Protection Association (2013). *NFPA 654: Standard for the Prevention of Fire and Dust Explosions from the Manufacturing, Processing, and Handling of Combustible Particulate Solids.*

National Fire Protection Association (2013). *NFPA 499: Recommended Practice for the Classification of Combustible Dusts and of Hazardous (Classified) Locations for Electrical Installations in Chemical Process Areas.*

OSHA SHIB Jul. 31, 2005 *Combustible Dust in Industry: Preventing and Mitigating the Effects of Fire and Explosions.*

ATEX Directive 94/9/EC *On the approximation of the laws of Members States concerning equipment and protective systems intended for use in potentially explosive atmospheres*

ASTM E2019: *Minimum Ignition Energy of a Dust Cloud in Air.*

European Standard EN 13821:2002 *Potentially explosive atmospheres—Explosion prevention and protection—Determination of minimum ignition energy of dust/air mixtures.*

Britton, L., Avoiding Static Ignition Hazards in Chemical Operations, AIChE CCPS, 1999.

CCPS, Guidelines for Safe Handling of Powders and Bulk Solids, AIChE Center for 4. Chemical Process Safety, 2005.

Cesana, C., Siwek, R., MIKE Software Manual, Kühner AG, Dinkelbergstrasse 1, CH-4127 Birsfelden, Switzerland.

It has been discovered that the inventive powder compositions are insensitive to ignition sources. This is advantageous from process safety and process design perspectives. Moreover, it has been discovered that the inventive compositions (with or without a binder) have improved blocking performance, as compared to the comparative compositions.

The invention claimed is:

1. A composition comprising at least the following: polymer particles comprising a coating on at least a portion of the total surface of the polymer particles, and wherein the coating is formed from a powder composition comprising at least one inorganic powder, and at least one organic powder selected from a metal stearate, and wherein the weight ratio of the total amount of the inorganic powder to the total amount of the organic powder is from 3.0 to 50.0, and wherein the inorganic powder comprises talc and the powder composition comprises at least 50 wt % of the talc based on the total weight of the powder composition.

2. The composition of claim 1, wherein the polymer particles are formed from a polymer composition comprising an olefin-based polymer.

3. The composition of claim 2, wherein the polymer composition comprises greater than 95 wt % of the olefin-based polymer, based on the weight of the polymer composition.

4. The composition of claim 1, wherein the composition comprises a binder.

5. The composition of claim 4, wherein the binder is a silicone fluid.

6. The composition of claim 1, wherein the inorganic powder further comprises at least one of the following: mica, calcium carbonate, finely divided silica, fumed silica, quartz, and combinations thereof.

7. An article comprising at least one component formed from the composition of claim 1.

8. A process to form the composition of claim 1, wherein the process comprises contacting the polymer particles with the powder composition.

9. A powder composition comprising at least the following: at least one inorganic powder, and at least one organic powder selected from a metal stearate, and
   wherein the weight ratio of the total amount of inorganic powder to the total amount of organic powder is from 3.0 to 50.0;
   wherein the total amount of inorganic powder and the total amount of organic powder comprise greater than, or equal to 95 wt %, based on the weight of the powder composition; and
   wherein the inorganic powder comprises talc and the powder composition comprises at least 50 wt % of the talc based on the total weight of the powder composition.

10. A composition comprising at least the following: polymer particles comprising a coating on at least a portion of the total surface of the polymer particles, and
    wherein the coating is formed from a powder composition comprising at least one inorganic powder, and at least one organic powder selected from a metal stearate;
    wherein the weight ratio of the total amount of the inorganic powder to the total amount of the organic powder is from 3.0 to 50.0; and
    wherein the composition comprises a binder.

* * * * *